Aug. 31, 1943. J. M. LUERS 2,328,477
TOOLHOLDER
Filed Jan. 12, 1942
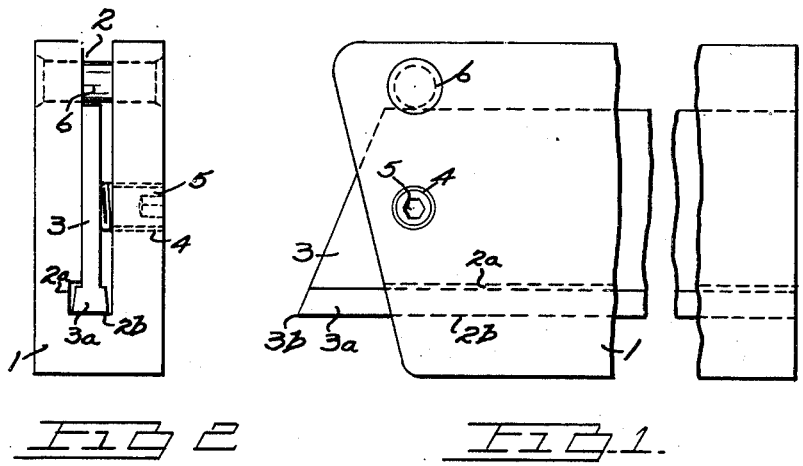
INVENTOR.
John M. Luers
By Gerald F. Baldwin
his Attorney.

Patented Aug. 31, 1943

2,328,477

UNITED STATES PATENT OFFICE 2,328,477

TOOLHOLDER

John M. Luers, Mount Clemens, Mich., assignor to John Milton Luers Patents Incorporated, Detroit, Mich., a corporation of Michigan Application January 12, 1942, Serial No. 426,415

3 Claims. (Cl. 29—96)

This invention relates to improvements in toolholders, and refers particularly to a one-piece toolholder slotted longitudinally intermediately of its width to receive a blade, and means cooperating with the holder for holding the blade in position.

Another object of the invention is to provide such a toolholder including auxiliary means for supporting the blade in the event that the cutting edge of the latter is subjected to a sudden excessive load when the tool is in operation.

A further object of the invention is to provide such a toolholder which is cheap and simple to manufacture, and which is so constructed that each time a blade is replaced in a holder after grinding the cutting edge must assume the same cutting position, so that it is correctly positioned to be fed into the work.

Having thus briefly and broadly stated some of the objects and advantages of the invention I will now proceed to describe a preferred embodiment with the aid of the accompanying drawing, in which:

Figure 1 illustrates a side elevation of the toolholder with a blade mounted therein, and Figure 2 is a front elevation thereof.

Referring to the drawing, 1 denotes a block, preferably rectangular in section, having an open-ended, longitudinal slot 2 formed therein intermediately of its width. The sides of the slot are parallel with one another throughout their length, and one side of the slot is longitudinally recessed at 2a for a short distance from its base 2b. Thus the sides of the slot are wider apart for a short distance adjacent the base 2b. Longitudinally slidable through the slot 2 is a flat blade 3 having a head 3a of increased width formed along its longitudinal side which is positioned adjacent the slot base 2b and is slidable in the recessed portion of the said slot. Formed through the side of the block 1 opposite its recessed side, at right angles to the slot 2 and opening into the latter intermediately of its height between the recessed portion and the open end is a threaded aperture 4 in engagement with which is a blade engaging member 5, shown in the form of a safety head set screw. This screw engages one side of the thinner portion of the blade 3 and forces the opposite side of the latter into intimate contact with the side of the slot 2 above the recessed portion 2a. A support 6, shown in the present instance in the form of a rivet, extends transversely through the block 1 and across the slot 2 towards the open end of the latter and just above the blade 3 to permit the latter to slide therebeneath. Both the engaging member 5 and the support 6 should be positioned adjacent the front of the block 1, that is adjacent the end of the latter from which the blade 3 projects and on which the said blade is provided with a cutting edge 3b.

When the engaging member 5 is screwed back the blade 3 is freely slidable in the slot 2 with its head extending into the recess 2a, and beneath the support 6. However when the member 5 is tightened the blade 3 is firmly engaged, and if sudden pressure is exerted upon the cutting edge 3b the support 6 functions as an auxiliary support to prevent any appreciable movement of the blade in an upward direction.

The forward edge face of the blade 3 across which at one extremity the cutting edge 3b is formed is rearwardly inclined from the latter in the conventional manner to provide chip clearance above the cutting edge, and in order that the engaging member 5 and the support 6 may be positioned in closer proximity to the cutting edge the front face of the block 1 may be inclined in the opposite direction as shown in Figure 1.

While in the foregoing the preferred embodiment of the invention has been described and shown, it is understood that the construction is susceptible to such alterations and modifications as fall within the scope of the appended claims.

What I claim is:

1. A toolholder comprising a solid block having an open-ended slot formed longitudinally therethrough intermediately of its width, said slot admitting a blade for sliding movement therethrough, one side wall of the slot being recessed for a short distance from the slot base to permit the passage of a head of increased width formed along one side of the blade, a support carried by the block extending across the slot permitting sliding movement of the blade between it and the base of the slot, the block being provided with a threaded transverse aperture formed through the side wall of the slot opposite the recessed wall, said aperture opening into the slot between its recessed portion and said support, and a screw in threaded engagement with said aperture to bear against one side of the blade and force the said blade into intimate contact with the opposite wall of the slot.

2. An arrangement of the character described comprising a solid block having an open-ended slot formed longitudinally therethrough intermediately of its width, a blade longitudinally slidable through said slot upon the base of the latter and projecting beyond one extremity of the block, said blade having a cutting edge formed across the projecting extremity of its face which rests upon the slot base, one side of the block having a transverse threaded aperture formed therethrough opening into the slot, a screw in threaded engagement with said threaded aperture to engage one side of the blade and force said blade into intimate contact with the other side of the slot, and a support carried by the block extending across the slot, said support being spaced from the slot base to permit sliding movement of the block between them, and said support holding the blade against material movement if a sudden thrust is exerted upon the cutting edge of the blade.

3. An arrangement of the character described comprising a block having an open-ended slot formed longitudinally therethrough intermediately of its width, said slot being longitudinally of increased width for a short distance from its base, a blade having a head of increased width formed along one side thereof longitudinally slidable through said slot and its portion of increased width respectively, the outer face of the head being slidable upon the slot base, said blade projecting from one extremity of the block and having a cutting edge formed across the outer face of the head, the block having a transverse threaded aperture formed therethrough opening into the slot above its portion of increased width, a screw in engagement with the threaded aperture exerting pressure against one side of the blade and forcing it into binding engagement with the opposite side of the slot, and a support carried by the block extending across the slot, said blade being slidable between said support and the slot base, said support holding the blade against appreciable movement when a sudden thrust is exerted upon the cutting edge.

JOHN M. LUERS.